(12) United States Patent
Espinasse et al.

(10) Patent No.: US 12,085,196 B2
(45) Date of Patent: Sep. 10, 2024

(54) FLEXIBLE PIPE FOR HYDRAULIC FRACTURING APPLICATIONS

(71) Applicant: FMC Technologies, Inc., Houston, TX (US)

(72) Inventors: Philippe Espinasse, Houston, TX (US); Gary Bernard, Houston, TX (US); Jean-Luc Streiff, Houston, TX (US); Dan Fink, Porter, TX (US)

(73) Assignee: FMC Technologies, Inc., Houston, TX (US)

( * ) Notice: Subject to any disclaimer, the term of this patent is extended or adjusted under 35 U.S.C. 154(b) by 561 days.

(21) Appl. No.: 17/288,262

(22) PCT Filed: Oct. 18, 2019

(86) PCT No.: PCT/US2019/056987
§ 371 (c)(1),
(2) Date: Apr. 23, 2021

(87) PCT Pub. No.: WO2020/086404
PCT Pub. Date: Apr. 30, 2020

(65) Prior Publication Data
US 2021/0381627 A1    Dec. 9, 2021

Related U.S. Application Data
(60) Provisional application No. 62/751,248, filed on Oct. 26, 2018.

(51) Int. Cl.
*F16L 11/08* (2006.01)
(52) U.S. Cl.
CPC ......... *F16L 11/083* (2013.01); *F16L 2201/30* (2013.01)

(58) Field of Classification Search
CPC ....... F16L 57/06; F16L 2201/30; F16L 9/125; F16L 11/127; B65G 53/523
(Continued)

(56) References Cited

U.S. PATENT DOCUMENTS

| | | | | |
|---|---|---|---|---|
| 5,172,730 A | * | 12/1992 | Driver | G01M 3/18 138/104 |
| 5,395,472 A | * | 3/1995 | Mandich | B29C 65/10 405/184.2 |

(Continued)

FOREIGN PATENT DOCUMENTS

| | | |
|---|---|---|
| DE | 2163954 A1 | 7/1972 |
| WO | 2010/036792 A2 | 4/2010 |

(Continued)

OTHER PUBLICATIONS

International Search Report issued in corresponding International Application No. PCT/US2019/056987, mailed on Apr. 15, 2020 (5 pages).

(Continued)

*Primary Examiner* — Patrick F Brinson
(74) *Attorney, Agent, or Firm* — Osha Bergman Watanabe & Burton LLP

(57) ABSTRACT

A flexible pipe includes one or more outer layers, a primary liner disposed internal to the one or more outer layers, and a removable liner disposed internal to the primary liner. Additionally, a flexible piping system includes the flexible pipe with a first end and a second end. Further, an annulus is disposed between the primary liner and the removable liner. Furthermore, a pressure port is provided and extends from the annulus to an outer surface of the flexible piping system. An end fitting is disposed at the first end of the flexible pipe.

3 Claims, 9 Drawing Sheets

(58) Field of Classification Search
USPC .............. 138/104, 98, 97, 36; 408/184.2
See application file for complete search history.

(56) References Cited

U.S. PATENT DOCUMENTS

| | | | | |
|---|---|---|---|---|
| 5,546,992 | A * | 8/1996 | Chick | F16L 9/18 |
| | | | | 138/104 |
| 5,634,497 | A * | 6/1997 | Neto | F16L 57/06 |
| | | | | 138/104 |
| 8,087,430 | B1 * | 1/2012 | Betz | F16L 11/20 |
| | | | | 138/104 |
| 9,267,636 | B2 * | 2/2016 | Chamberland | F16L 57/06 |
| 9,784,388 | B1 * | 10/2017 | Metz | B32B 3/08 |
| 10,060,570 | B2 * | 8/2018 | Kersey | G01M 3/22 |
| 10,113,679 | B2 * | 10/2018 | Shuck | F04B 53/16 |
| 2008/0174110 | A1 * | 7/2008 | Olson | F16L 57/06 |
| | | | | 285/55 |
| 2009/0129853 | A1 * | 5/2009 | Pionetti | B05D 7/222 |
| | | | | 427/234 |
| 2010/0212768 | A1 | 8/2010 | Resendes | |
| 2013/0181728 | A1 * | 7/2013 | Strohmer | G01M 3/18 |
| | | | | 324/693 |
| 2014/0000742 | A1 * | 1/2014 | Betsinger | G01N 27/20 |
| | | | | 138/36 |

FOREIGN PATENT DOCUMENTS

| | | |
|---|---|---|
| WO | 2012/059729 A1 | 5/2012 |
| WO | 2018/091693 A1 | 5/2018 |

OTHER PUBLICATIONS

Written Opinion of the International Searching Authority issued in corresponding International Application No. PCT/US2019/056987, mailed on Apr. 15, 2020 (11 pages).

1 Office Action issued in corresponding CA Application No. 3,117,590 dated Aug. 12, 2022 (7 pages).

* cited by examiner

FLEXIBLE PIPE FOR HYDRAULIC FRACTURING APPLICATIONS

BACKGROUND

In a well fracture system, high pressure fluid may be pumped from one or more pump trucks to one or more wellheads, via a pump manifold, a tree manifold, and/or other wellsite equipment. The well site equipment may be connected via rigid pipes, which may present several disadvantages.

The rigid pipes may not be connected between pieces of equipment along direct paths, but rather may be connected along redundant, angular paths, as shown in FIGS. 1-2. Swivel joints may be used to connect the rigid pipes in these paths. The redundant, angular paths may be necessary to compensate for misalignment between an inlet of a first piece of equipment and an outlet of a second piece of equipment. For example, the inlet and outlet may be horizontally and/or vertically offset from each other, or may be oriented at different angles. Such misalignment is common in wellsite equipment and will be discussed in more detail below. Redundant, angular connection paths may be required for rigid pipes to connect between a misaligned inlet and outlet.

The redundant, angular paths may also be necessary for the rigid pipes to withstand vibration caused by wellsite equipment, especially the pump trucks. Rigid pipes connected along direct paths may be at risk of breaking, especially at their junction points, due to the significant movement caused by the vibrations of the pump trucks. In contrast, the redundant, angular paths may allow the rigid pipes to better withstand the vibrations of the pump trucks.

Rigid pipes connected in redundant, angular paths may take up significant space at a wellsite and require significant time and personnel to assemble and disassemble. They may also include numerous points at which leaks or failure are likely because multiple pieces of rigid pipe may be joined together to connect the equipment. Each joint may be a weak point where leaks and/or failure may be more likely. These issues may be exacerbated if small diameter rigid pipes are used because multiple flow paths will be necessary to connect the first piece of equipment to the second piece of equipment. The redundant, angular paths may further make the rigid pipes susceptible to erosion, as a result of the numerous bends and angles associated with such connections.

As mentioned above, the inner surfaces of pipes used in fracture operations may experience significant damage caused by the erosive fluids which may be injected therethrough. Particulates such as sand may erode the inner surfaces of the pipes, especially around pipe junctions. This may create leak paths and weak points at which failure is more likely. Preventing leaks and failure may require frequently replacing pipes and piping components that have been damaged by corrosion and/or erosion.

SUMMARY

The present disclosure relates to flexible piping, including flexible piping having a removable/replaceable internal liner. The flexible piping may overcome some or all of the shortcomings of conventional piping, especially piping used in fracture systems, described above. The present disclosure further relates to methods of manufacturing and using such systems.

This summary is provided to introduce a selection of concepts that are further described below in the detailed description. This summary is not intended to identify key or essential features of the claimed subject matter, nor is it intended to be used as an aid in limiting the scope of the claimed subject matter.

In a first aspect, embodiments of the present disclosure relate to a flexible pipe which may include one or more outer layers, a primary liner disposed internal to the one or more outer layers, and a removable liner disposed internal to the primary liner.

In another aspect, embodiments of the present disclosure relate to a flexible piping system which may include a flexible pipe having a first end and a second end, wherein the flexible pipe includes one or more outer layers, a primary liner disposed internal to the one or more outer layers, and a removable liner disposed internal to the primary liner; an annulus disposed between the primary liner and the removable liner; a pressure port extending from the annulus to an outer surface of the flexible piping system; and an end fitting disposed at the first end of the flexible pipe.

In another aspect, embodiments of the present disclosure relate to a method which may include the following steps: injecting an erosive fluid through a flexible piping system connected to a downstream component and an upstream component, wherein the flexible piping system includes a primary liner, a removable liner, and an annulus disposed between the primary liner and the removable liner; and monitoring an integrity of the removable liner via one or more sensors disposed within or fluidly connected to the annulus.

Other aspects and advantages will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
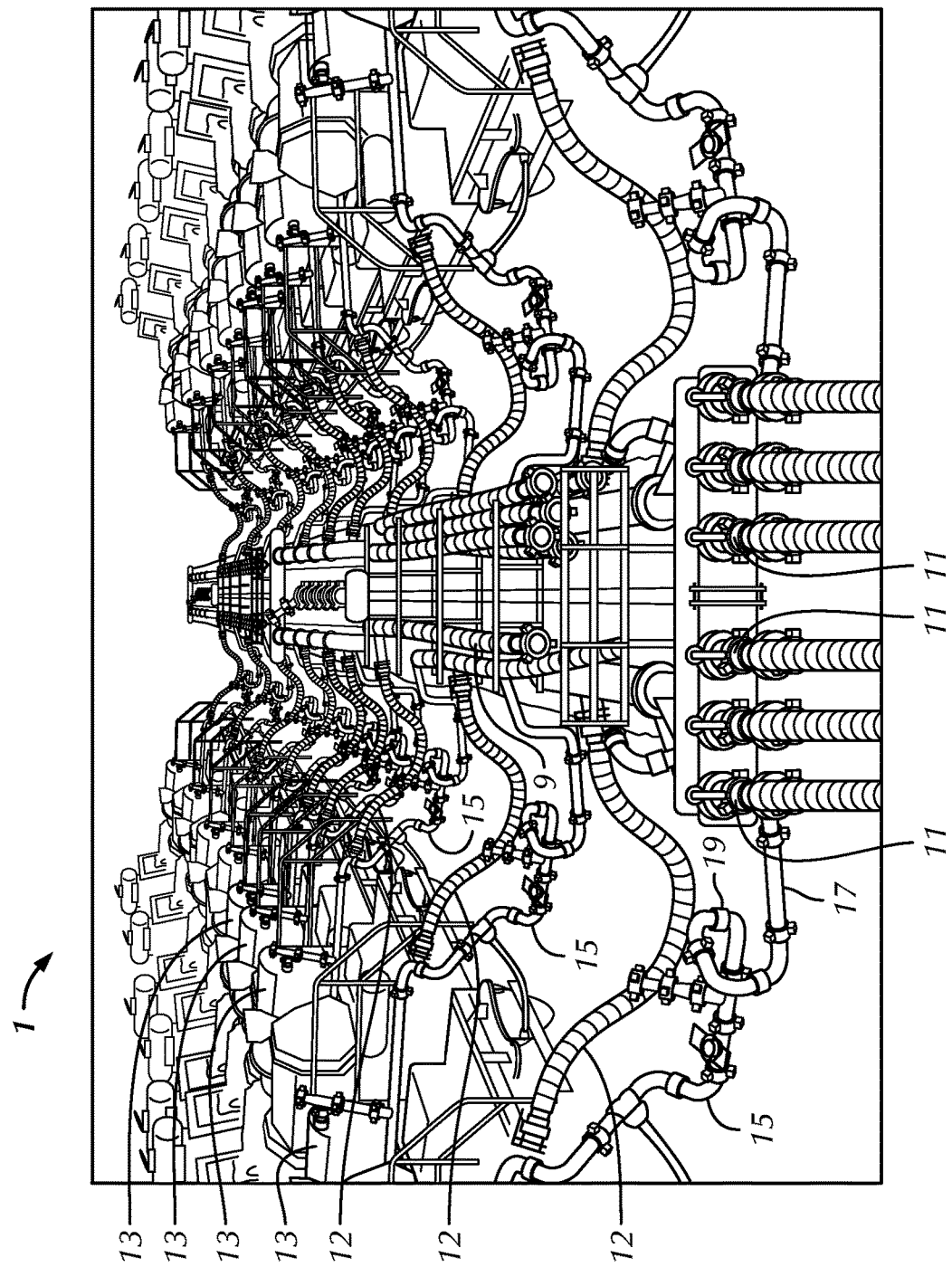
FIGS. 1-2 are fracture systems in accordance with the prior art.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

As used herein, the term "coupled" or "coupled to" or "connected" or "connected to" may indicate establishing either a direct or indirect connection, and is not limited to either unless expressly referenced as such.

Embodiments of the present disclosure relate generally to flexible pipes, which may be useful in wellbore fracture operations. Flexible pipes in accordance with the present disclosure may include removable liners. The flexible pipes may be able to connect any equipment at a wellsite, and may be less susceptible to damage due to wellsite conditions, compared to standard pipes. The flexible pipes may also be robust to damage caused by erosive or corrosive fluids injected therethrough.

As discussed above, the present disclosure relates to flexible piping for wellsite systems and methods of using flexible piping in wellbore operations. In some embodiments, flexible piping described herein may withstand high pressures and erosive environments, and thus may replace traditional rigid pipes used for such operations. For example, the flexible piping systems disclosed herein may be suitable for operation at pressures of up to 10,000 psi, up to 12,000 psi, or up to 15,000 psi in some embodiments.

Figure 2:
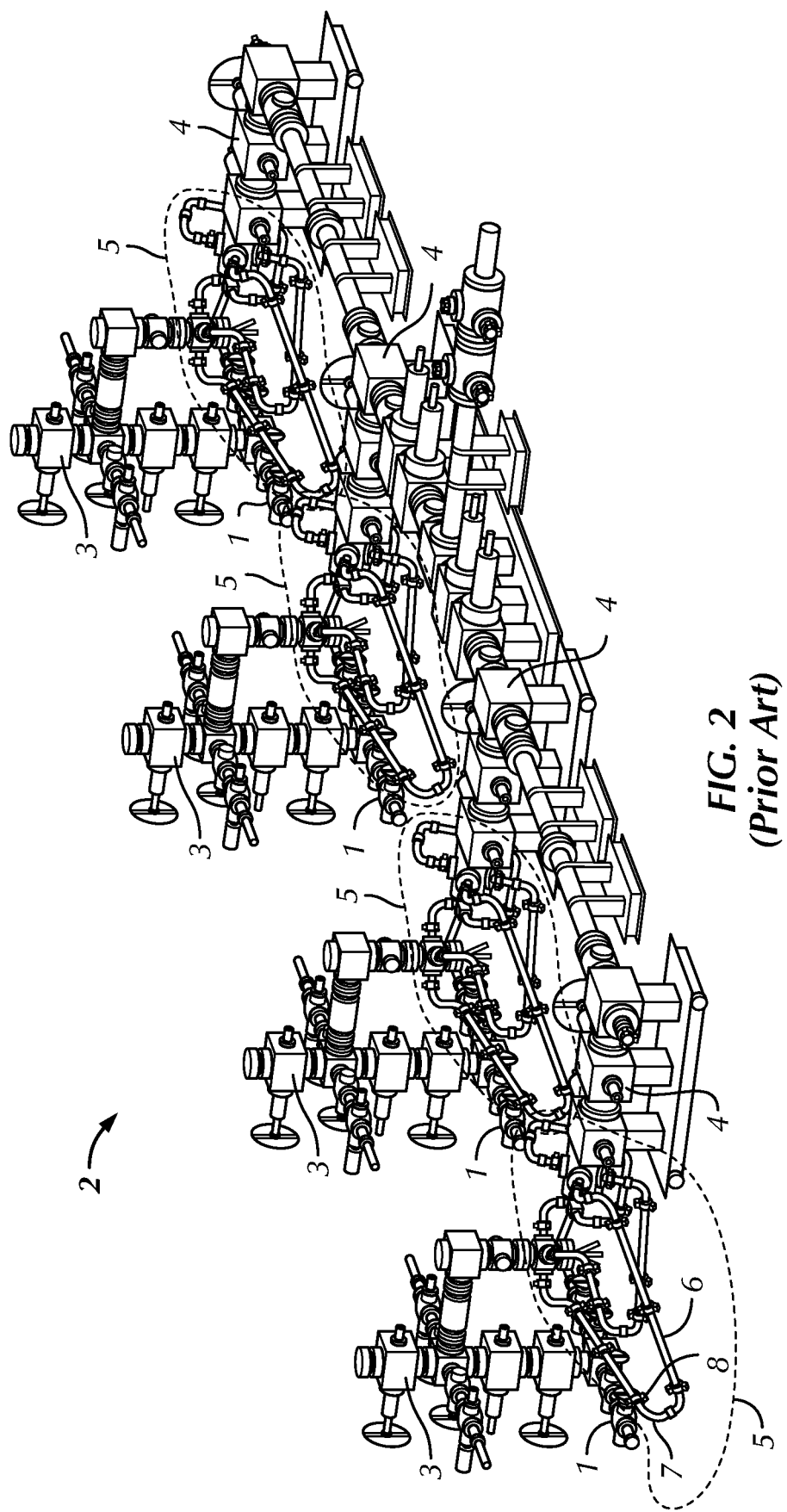

FIGS. 1-2 illustrate examples of traditional wellsite systems that have been used for fracturing operations.

FIG. 1 illustrates a pumping system 1, including a pump manifold 9. The pumping system may be configured to pump fracturing fluid, such as water containing sand and chemicals down one or more wellbores. Inlet lines 11 may carry low pressure fluid to the pump manifold 9. Low pressure lines 12 may carry the low pressure fluid from the pump manifold 9 to pump trucks 13. The low pressure lines 12 may be made of rubber or elastomeric hose, and may not be capable of withstanding high pressures. The pump trucks 13 may pump the fluid and thereby pressurize it to a high pressure. The high pressure fluid may be returned to the pump manifold 9 via high pressure lines 15. The high pressure lines 15 may comprise rigid piping components 17 connected via swivel joints 19. The rigid piping components 17 may be necessary to withstand the high pressures. As illustrated in FIG. 1, the high pressure lines 15 may not connect the pump trucks 13 to the pump manifold 9 along direct paths, but may instead follow redundant, angular paths. The redundant, angular paths may be used so as to enable the high pressure lines 15 to better absorb the vibrations imparted to them via the pump trucks. The high pressure fluid may flow through the pump manifold 9 to an isolation valve 21, which may in turn be connected to a well manifold (see FIG. 2).

FIG. 2 illustrates a fracture system 2 in which connections are made between Christmas trees 3 and a frac manifold 4 using flowline paths 5. The flowline paths 5 may each be composed of one or more rigid pips, which may include straight segments 6 and angled segments 7. The piping components may be connected to each other using swivel joints 8. Typically, the frac manifold 4 is assembled and then connected to the trees 3 using the flowline paths 5. The segments 6, 7 and the swivel joints 8 collectively provide adjustability in the flowline paths 5 that facilitate connections between frac manifold 4, which is not necessarily in strict alignment with the trees 3, and the trees 3. As depicted, more than one flowline path 5 may be connected between each Christmas tree 3 and the frac manifold 4 to provide the necessary flow volume for a fracturing operation. These multiple connections may occupy a significant amount of space in the fracture system 2, and may require a significant amount of time and personnel to assemble, test, and disassemble.

The pumping system 10 illustrated in FIG. 1 and the fracture system 2 illustrated in FIG. 2 may be used together to fracture one or more wellbores. In some embodiments, one system 1, 2 may be used without the other and may instead be used with other wellsite equipment.

Figure 3:
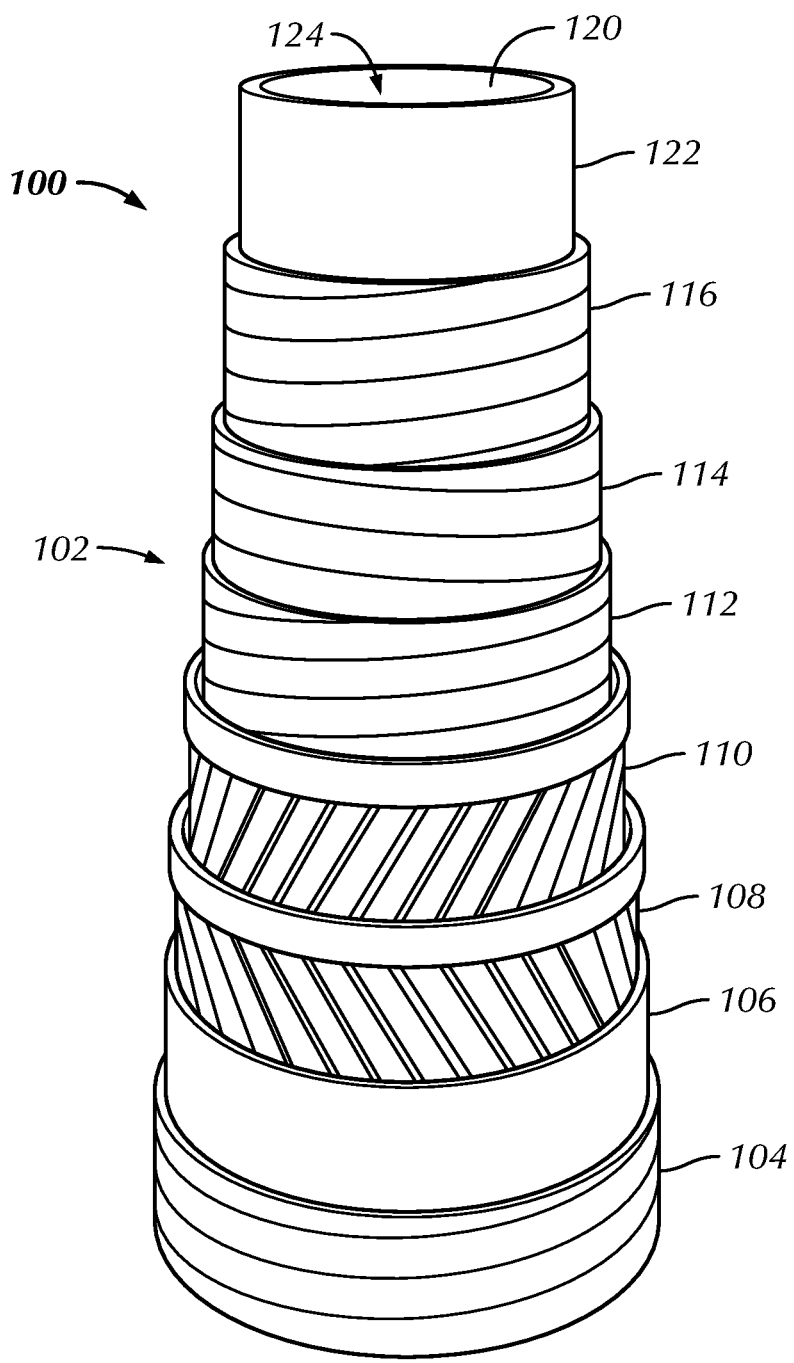
FIG. 3 is a flexible pipe in accordance with embodiments of the present disclosure.

In one aspect, embodiments of the present disclosure relate to a flexible pipe including a removable liner. FIG. 3 illustrates a flexible pipe in accordance with the present disclosure, which may include one or more outer layers, a primary liner disposed interior to the innermost of the outer layers, and a removable liner disposed interior to the primary liner. Some or all of these elements may be illustrated in each of the following FIGS. 4-12. One skilled in the art will recognize that a flexible pipe may combine elements illustrated in different figures, and may include elements not illustrated in any of the figures.

FIG. 3 illustrates a flexible pipe 100 having multiple outer layers 102, and having a primary liner or internal sheath 122 and a removable liner 124 disposed internal to the outer layers 102. The outer layers 102 may include: an external metal layer 104, an external sheath 106, two armor layers 108, 110, three pressure vault layers 112, 114, 116, which are disposed around the primary liner/internal sheath 122. One skilled in the art will recognize that a flexible pipe 100 may include a different number of outer layers 102, a different configuration of outer layers 102, and/or different types of outer layers 102. The outer layers 102 illustrated in FIG. 1 are described below.

The primary liner/internal sheath 122 may be intended to confine a fluid conveying passage 120 extending through the flexible pipe 100. The internal sheath 122 may be formed from a polymeric material, for example based on a polyolefin such as polyethylene, on the base of a polyamide such as PA11 or PA12, or on the basis of a fluorinated polymer such as polyvinylidene fluoride (PVDF). The thickness of the primary liner 122 may be, for example between 5 mm and 20 mm.

The pressure vault layers 112, 114, 116 may surround the internal sheath 122. The pressure vault layers 112, 114, 116 may be configured to reabsorb the forces related to the pressure a fluid may apply against the liners 122, 124 and the internal sheath 122. Each pressure volt layer 112, 114, 116 may be formed with a metal profile wire shaped into a helix having a short pitch to surround the internal sheath 122. In some embodiments, the pressure volt layers 112, 114, 116 may comprise helices oriented in alternating directions. In some embodiments, the profiled wire may have a Z-shaped, T-shaped, U-shaped, K-shaped, X-shaped, or I-shaped geometry. In some embodiments, the helix may have an angle of an absolute value between 75 degrees and 90 degrees, or approximately 80 degrees.

The tensile armor layers 108, 110 may surround the pressure volt layers 112, 114, 116. The tensile armor layers 108, 110 may comprise a pair of layers, with a first layer 108 having armor elements wound in a first direction, and a second layer 110 having armor elements wound in a second direction. The armor layers 108, 110 may be formed with metal wires or a composite material, and may have a high mechanical strength. Each armor layer 108, 110 may rest on an anti-wear strip (not shown).

The external sheath 106 may protect the pressure volt layers 112, 114, 116 and the tensile armor layers 108, 110, by preventing fluid located outside the flexible pipe 100 from reaching those layers. The external sheath 106 may be formed from a polymeric material, for example based on a polyolefin such as polyethylene, on the base of a polyamide such as PA11 or PA12, or on the basis of a polypropylene based polymer. The thickness of the external sheath 106 may be, for example between 5 mm and 20 mm.

The external metal layer 104 may surround the external sheath 106. In some embodiments, the external metal layer 104 may be formed with a metal profile wire shaped into a helix, which may have a short pitch. The external metal layer 104 may reabsorb the forces related to the pressure a fluid may apply against the external sheath 106 but acts principally as a mechanical protection for that layer.

The specific combination of outer layers 102, and the properties of each outer layer 102, included in a particular flexible pipe 100 may be chosen based on a variety of factors. These factors may include the volume, pressure, chemical characteristics and temperature of the fluid conveyed through the fluid conveying passageway 120. The factors may further include the diameter of the fluid conveying passageway 120, the length of the flexible pipe 100, and the radius of curvature of the flexible pipe 100. One skilled in the art will recognize that other factors may be used in determining the nature and combination of outer layers 102 to be used in a particular flexible pipe 100 for a particular application.

The outer layers 102 of the flexible pipe 100 may not be bonded to each other. Accordingly, failure/rupture of one outer layer 102 may be less likely to induce failure/rupture of an adjacent outer layer 102. This may prevent overall failure of the pipe 100, which may be catastrophic compared to the failure of a single layer, and may extend the lifespan of the pipe 100.

The primary liner 122 and a removable liner 124 (described further in relation to FIGS. 4-6) may be disposed within the innermost of the outer layers 102. The removable liner 124, primary liner 122 and the outer layers 102 may be configured such that the removable liner may be removed from the flexible pipe 100 and may be readily replaced.

Removable liner 124 may be formed from a flexible, resilient, erosion resistant polymer. For example, removable liner 124 may be formed from a urethane based polymer or materials similar to that of the inner liner 122. The flexible nature of the removable liner may facilitate installation, removal, and replacement, and the resilient, erosion resistant internal liner may provide for useful lifespans, especially in the harsh erosive environment associated with fracturing operations as noted above.

Figure 4:
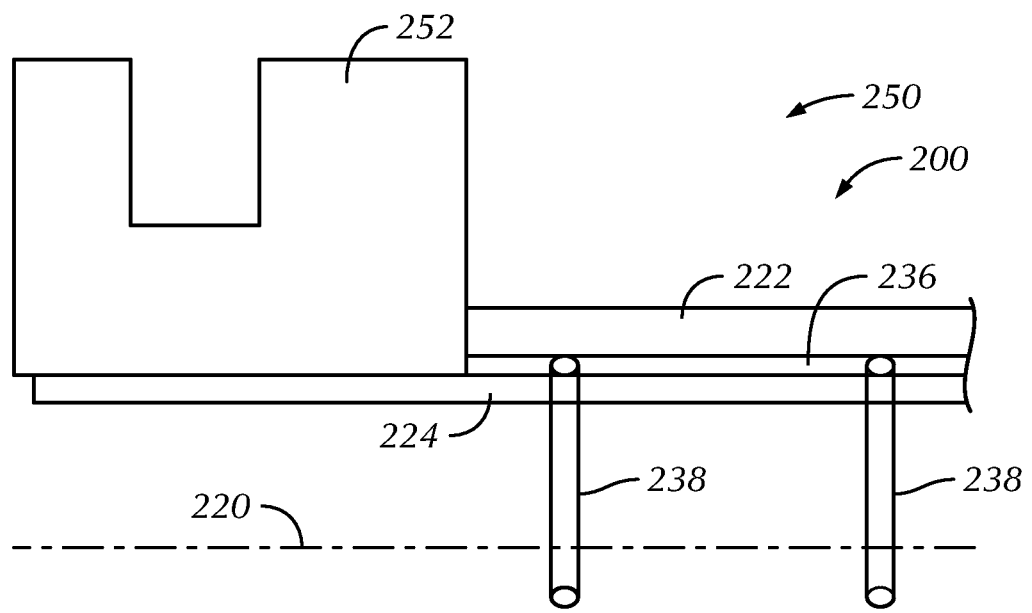
FIGS. 4-6 are flexible pipe systems in accordance with embodiments of the present disclosure.
Figure 5:
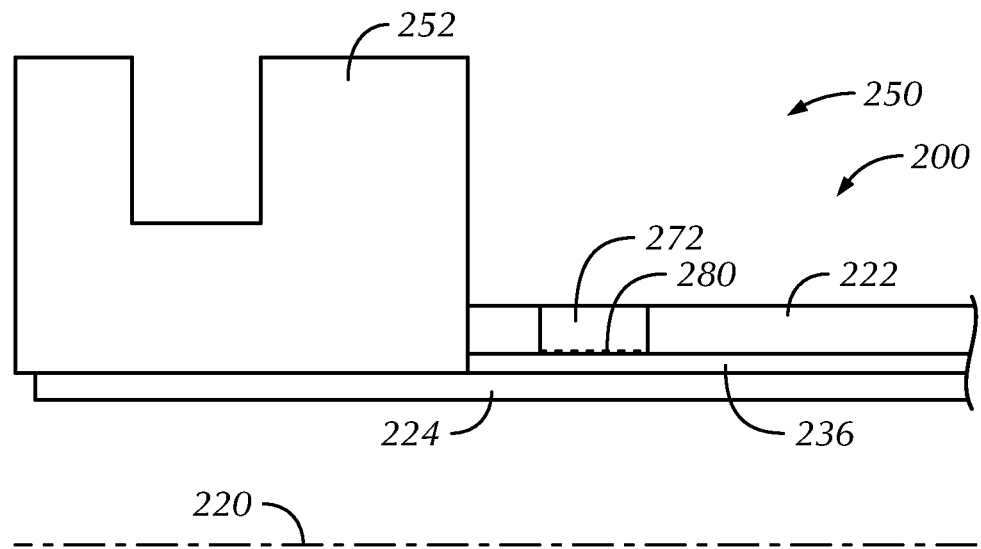
Figure 6:
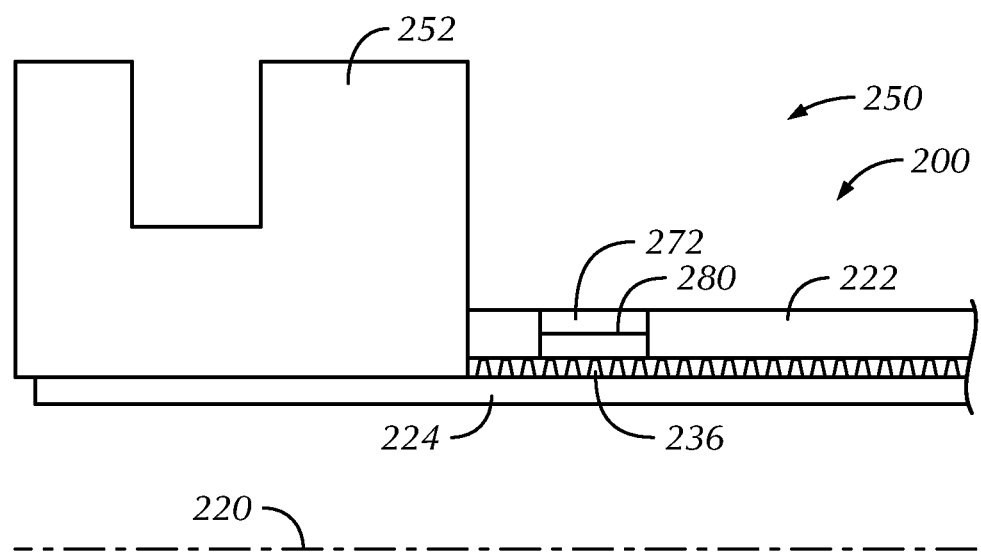

One skilled in the art will recognize that the "double liner" structure, comprising a primary liner and a removable liner disposed inside of the primary liner, may be used within a variety of piping components and end fittings to form flexible piping systems. FIGS. 4-6 illustrate flexible pipe systems in accordance with the present disclosure. The flexible pipe systems may include flexible pipes similar to those described above, such as with respect to FIG. 3.

Flexible pipe systems described herein may include a flexible pipe terminating at one or more end fittings. The flexible pipe 200 may be configured to interact and seal with the end fitting. In some embodiments, the removable liner 224 may be configured to extend beyond an internal end of the end-fitting, such that the removable liner 224 partially or wholly covers an internal surface of the end fitting.

The properties of the primary liner 222 may be selected based on features of the wellsite system and operations in which the flexible pipe system 250 is used. The primary liner 222 may be resistant to erosion, corrosion, chemical fluids, pressure, cold flow and temperature, may be able to bend to a desired radius of curvature, and may or may not be elastomeric. The primary liner 222 may be formed from a polymeric material, for example based on a polyolefin such as polyethylene, on the base of a polyamide such as PA11 or PA12, or on the basis of a fluorinated polymer such as polyvinylidene fluoride (PVDF). The thickness of the primary liner 222 may be, for example between 5 mm and 20 mm.

A removable liner 224 may be disposed internal to the primary liner 222, and may be removable from the flexible pipe system 250. The removable liner 224 may not be bonded to the primary liner 222. The removable liner 224, in some embodiments, may be removed from the flexible pipe system 250 without removing or disturbing other components. This may allow the removable liner 224 to be replaced without necessitating replacement and/or modification of other components of the flexible pipe system 250. The removable liner 224 may be more likely to experience damage than other components of the flexible pipe system 250 because it is adjacent to the fluid conveying passageway 220, and therefore may directly contact erosive and/or corrosive fluids at high pressures. The removable liner 224 may protect other components, such as the primary liner 222 from these fluids.

The replaceability of the removable liner 224 may extend the lifespan of the flexible pipe system 250 by allowing the removable liner 224, which is more likely to experience damage than other components, to be replaced without replacing other components. This may decrease the cost of using the flexible pipe system 250 and may also decrease the likelihood of failure of the flexible pipe system 250.

In some embodiments, the primary liner 222 and the removable liner 224 may be different colors from each other. This may make visual inspection of the liners 222, 224, especially the removable liner 224, easier. The removable liner 224 may be readily inspected for damage, and any damaged sites found may be readily assessed. Differing colors for the liners 222, 224 may also allow the liners 222, 224 to be visually differentiated during removal and replacement of the removable liner, thereby increasing the ease with which these processes may be monitored.

The flexible pipe system 250 may be able to function safely and efficiently even when the removable liner 224 is minimally damaged. For example, a portion or area of the removable liner may become eroded or damaged. Typically, such issues warrant immediate shutdown due to the catastrophic damage pipe failures may cause when the pipes contain high pressure fluids. However, in such a situation for embodiments herein, the primary liner 222 may contain the fluid in passage 220 and may protect outer layers and other components from any fluid within the fluid conveying passage 220. This may allow operations using the flexible pipe system 250 to continue for a certain duration of time after damage is detected, instead of being immediately halted, thereby making operations using the flexible pipe system 250 more efficient.

The removable liner 224 may extend internally to an end fitting 252 (described further in relation to FIGS. 7-12). The removable liner 224 may or may not extend significantly beyond the length of the primary liner 222 and the outer layers. In some embodiments, the removable liner 224 may extend nearly to a distal end of the end fitting 252.

The properties of the removable liner 224 may be selected based on features of the wellsite system and operations in which the flexible pipe system 250 is used. The removable liner 224 may be resistant to erosion and chemical fluids, may be easy to remove from the flexible pipe system 250, may be able to bend to a desired radius of curvature, and may or may not be elastomeric. In some embodiments, the removable liner 224 may be formed from a non-metallic material, such as urethane or a composite rubber or materials similar to that of the inner liner. The removable liner 224 may be formed from a flexible, resilient, erosion resistant polymer. For example, removable liner 224 may be formed from a urethane based polymer or materials similar to that of the inner liner 222

In some embodiments, shown for example in FIGS. 5 and 6, the flexible pipe system 250 may include means for detecting a leak within or damage to the removable liner 224. Such embodiments may allow for real-time or near real-time monitoring. The removable liner 224 may be removed and replaced whenever damage/leaking is indicated. In some embodiments, an annulus 236 may be used to monitor damage/leakage indirectly.

An annulus 236 may be formed between the removable liner 224 and the primary liner 222. The annulus 236 may extend along the length of the flexible pipe system 250, such that a portion of the removable liner 224 does not contact the primary liner 222 along the entire length of the liners 222, 224. The annulus 236 may be maintained, for example, by structure disposed intermediate the primary liner 222 and the removable liner 224. The outer diameter of the removable liner 224 and the inner diameter of the primary liner 222 may be chosen to allow the annulus 236 to be maintained therebetween. It should be recognized, however, that the flexible and erosion resistant nature of the removable liner may impact the integrity of the annular region when pressure is applied by a fluid traversing axial pathway 220. Further, the means used to provide a flow area in the annulus to promote leak detection should be arranged such that the internal surface of the removable liner remains smooth, avoiding the formation of protrusions or ridges that would promote erosion. Means by which the annulus 236 may be maintained are discussed below. One skilled in the art will recognize that these are examples that may be used independently or in conjunction with each other, and that other means for maintaining an annular space between two layers may also be used without departing from the scope of the disclosure.

In some embodiments, protrusions or other structures (not shown) may be formed on an internal surface of the primary liner 222, such that the removable liner 224 may rest on the structures, and thereby be held away from the remainder of the primary liner 222. Each of the structures may extend along the entire length of the primary liner 222 or along a portion of the length of the primary liner 222. In some embodiments, the structures may be longitudinal or helical, or may extend around a diameter of the primary liner 222. For example, a flexible, erosion resistant removable liner may have a smooth internal surface and a longitudinally or helically ribbed outer surface, as illustrated in FIG. 6. The peaks of the ribs may support the removable liner in contact with the primary liner when a pressurized fluid is flowing within axial pathway 220. The valleys between the peaks may then provide a pathway within and along the annular region for fluid to flow to a leak detection sensor disposed at a terminal end or along the length of the piping system. The structure should be of sufficient flexibility to facilitate installation and removal of the removable liner, while of sufficient strength to avoid flattening upon application of pressure from a fluid in axial pathway 220.

In some embodiments, as illustrated in FIG. 4, the removable liner 224 may include structures 238, disposed intermediate removable liner 224 and primary liner 222, which may maintain the external structure of the removable liner 224 and a fluid path through the annulus. Similar to the integral structure described above in relation to FIG. 6, the structures 238 may be disposed or wound between the removable liner and primary liner 222 so as to maintain the annular flow area while not deforming the internal surface of the removable liner. The structures 238, for example, may take the form of thin wires or rods disposed along the length of removable liner 224. The spacing between the rods 238 may be determined based on properties of the flexible pipe system 250, a wellsite system in which the flexible pipe system 250 is used, and/or a fluid which is flowed through the flexible pipe system 250. The rods 238 may extend longitudinally or helically between the liners 222, 224, in some embodiments. The rods 238 may maintain the removable liner 224 in a cylindrical configuration, which may in turn maintain the annulus 236 between the liners 222, 224, along the length and around the circumference of the liners 222, 224. In some embodiments, surface structures and rods 238 may be used in conjunction with each other to maintain the annulus 236.

The end fitting 252 may be any type of end fitting, which is described further in relation to FIGS. 7-12. The end fitting 252 may be selected based on properties of the wellsite system in which the flexible pipe system 250 is used, as well as the configuration of the components to which the fitting will be connected. In some embodiments, the end fitting 252 may include features, such as a flange and/or one or more bolt holes which may allow the end fitting 252, and thereby the flexible pipe system 250, to be attached to other elements of a wellsite system. One skilled in the art may readily envision that an end fitting 252 may also include other attachment elements, such as a hammer union, quick connect system components, or may include no attachment elements, so long as the end fitting is properly securable to the other piping components for the desired pressure rating.

The flexible pipe system 250 may allow a determination of whether or not the removable liner 224 has been damaged to be made without direct inspection of the removable liner 224. As discussed above, an annulus 236 may be formed between the removable liner 224 and the primary liner 222. When damaged, the annulus 236 may be filled with fluid, and the presence of the fluid or a pressure of the fluid within the annular region may be detected while the flexible pipe system 250 is in use. For example, a pressure sensor, moisture sensor, dielectric sensor, densitometer or another means for measuring a change in the annular environment may be used. In some embodiments, an array of dielectric sensors may be disposed along a length of the piping system and may be configured to provide an indication of the location of the leak, such that further inspection as to the extent of the damaged area may be made before simply replacing the replaceable liner and putting the pipe back into service. The measurement system may thus provide an indication of whether or not the removable liner 224 has failed/ruptured, as well as a location of the rupture in some embodiments. An indication of damage may allow a system operator to take the flexible piping system out of operation and to subsequently replace the removable liner 224. As discussed above, an indication of damage may not immediately necessitate replacement of the removable liner 224, but rather may indicate that the removable liner 224 should be replaced within a certain timeframe.

As shown in FIG. 5, for example, a pressure port 272 may connect a terminal end of the annulus 236 to the pressure sensor. The pressure port 272 may be formed through the outer layers. The outer layers may include features (not shown) that allow the pressure sensor to be mounted on or fluidly connected to the outer layers.

The pressure port 272 may further be configured such that the removable liner 224 may not be extruded into the port 272. For example, a barrier 280 may be disposed within the pressure port 272. Barrier 280 may be a grid, for example, that may allow fluid to pass while preventing the removable liner 224 from being extruded therethrough. The dimensions and placement of the grid should be sufficient to maintain the integrity of the removable liner while permitting flow from the annular region. The barrier 280 may have similar properties to the pressure vault layers described above.

In some embodiments, the pressure port 272 may be formed through the primary liner 222 and/or the outer layers of the flexible pipe 200. In some embodiments, the pressure port 272 may be formed between the flexible pipe 200 and the end fitting 252. One skilled in the art will readily recognize that leaks into the annulus 236 may be measured by other means, for example, via a sensor disposed within and/or along the annulus or via indirect means, such as contact between the primary liner 222 and the removable liner 224. Visual inspection of the liners 222, 224 may also play a role in monitoring. Such options do not depart from the scope of the disclosure.

Figure 7:
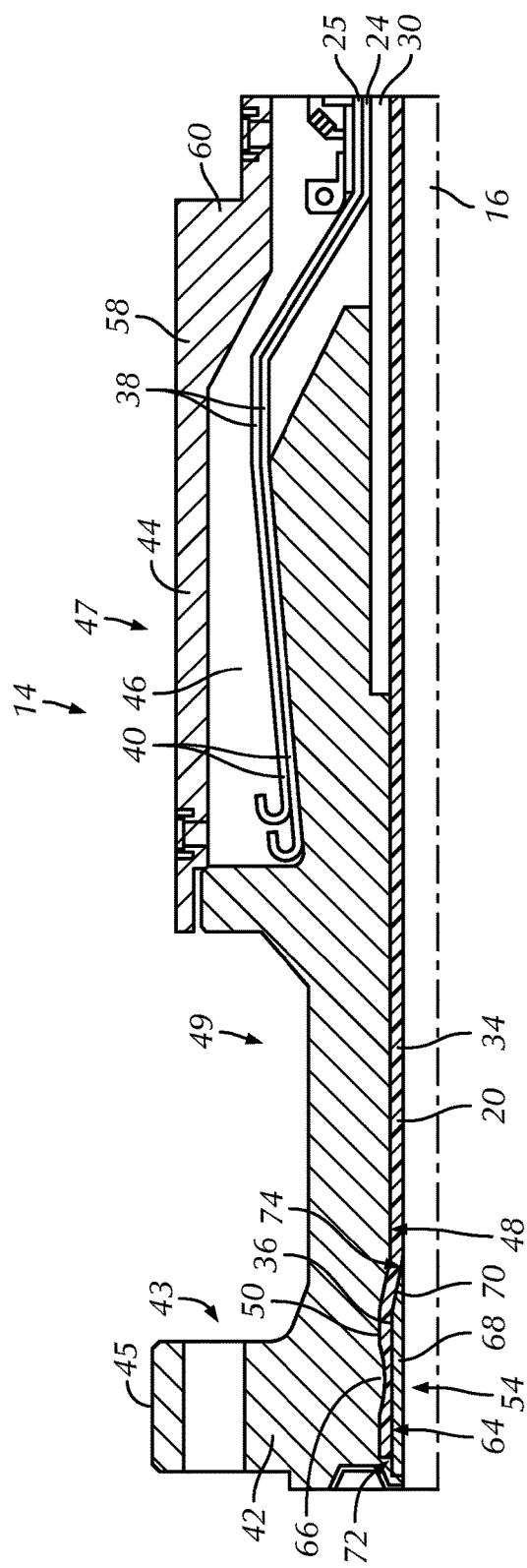
FIG. 7 is a schematic view of an end fitting in accordance with embodiments of the present disclosure.

In some embodiments, shown for example in FIGS. 7-12, the flexible pipe system (see 250 in FIGS. 4-6) may include an end fitting 14 (see 252 in FIGS. 4-6). As shown in FIG. 7, in addition to a front region 36 of an internal sheath 18, end sections 40 of armor layers 24, 25, the end fitting 14 may include an end vault 42 and an outer cover 44 around the end vault 42. The outer cover 44 may axially protrude rearwards from the end vault 42. Additionally, the outer cover 44 may delimit with the end vault 42 and the pressure vault 30, a reception chamber 46 receiving the end sections 40 of the armors layers 24, 25. The end vault 42 may define an internal surface 48 in contact with the front region 36 of the internal sheath 18. Further, the internal surface 48 may include a front longitudinal part 50 extending along the X-X' direction.

The end fitting 14 may further include a front sealing assembly 54 arranged around the front region 36 of the internal sheath 18. In some embodiments, the front sealing assembly 54 may be arranged around a pressure sheath 20. The end fitting 14 may additionally include a rear sealing assembly (not shown) arranged around the exterior sheath 32. Additionally, the end vault 42 may have a front region 43 with an end flange 45, a back region 47, covered by the outer cover 44, and an intermediate region 49 connecting the front region 43 to the back region 47. In a non-limiting example, the end vault 42 may be connected to another end fitting 14 or to terminal equipment, advantageously by the end flange 45.

In one or more embodiments, the outer cover 44 may have a tubular peripheral wall 58 extending around the longitudinal direction X-X'. The peripheral wall 58 may include a rear edge 60 extending axially rearward beyond the end vault 42. The outer cover 44 delimits the reception chamber 46 radially outwards. The end vault 42 and a front region 62 of the pressure sheath 20 delimit the reception chamber 46 radially inwards. It is further envisioned that the reception chamber 46 may be filed with a filling material intended to anchor the end sections 40 of the armor elements 38 inside the reception chamber 46. In a non-limiting example, the filling material may be a thermosetting resin such as an epoxy resin or a thermoplastic resin. In some embodiments, the front sealing assembly 54 may be arranged at the front of the end fitting 14 and is longitudinally spaced apart from the reception chamber 46, at the front of the reception chamber 46, in the front region 43. In addition, the front sealing assembly 54 may include a cannula 64 supporting at least one part of the front region 36 of the pressure sheath 20 and an annular protrusion 66 arranged on the internal surface 48 of the end vault 42 and protruding toward the central passage 16, and more particularly arranged on the front part 50 of the internal surface 48 of the end vault 42. The front region 36 of the internal sheath 18 may be circumferentially tightened between the protrusion 66 and the cannula 64. The protrusion 66 may be integral with the end vault 42 or an annular element fixed to the internal surface 48 of the end vault 42.

The protrusion 66 may protrude beyond the internal surface 48 of the end vault 42 toward the central passage 16 to a distance, for example, between 50 mm and 300 mm. In some embodiments, the front region 36 of the pressure sheath 20 may be plastically deformed by the protrusion 66. Further, the cannula 64 may have a general tubular shape. The cannula 64 may include a cylindrical front portion 68 and a rear truncated cone shape portion 70 connected to the front portion 68. The front portion 68 of the cannula 64 may be arranged facing to the front part 50 of the internal surface 48 of the end vault 42. It is further envisioned that an exterior surface 72 of the front portion 68 of the cannula 64 and the front part 50 of the internal surface 48 of the end vault 42 may be substantially concentric. The rear portion 70 of the cannula 66 may allow for a progressive radial spreading of the front region 36 of the pressure sheath 20 until the pressure sheath 20 covers the front portion 68 of the cannula 64.

In one or more embodiments, the cannula 64 may have a longitudinal length between 100 mm and 400 mm. The protrusion 66 may be arranged facing to the front portion 68 of the cannula 64. In a non-limiting example, the cannula 64 may be made in metal, such as carbon or stainless steel. In addition, the end fitting 14 may further include a longitudinal restraining element for restraining the cannula 64 to the end vault 42. In some embodiments, the rear sealing assembly may include a rear crimping ring for crimping the external sheath, and a rear clamping flange of the rear crimping ring, fixed to the outer cover 44.

Figure 8:
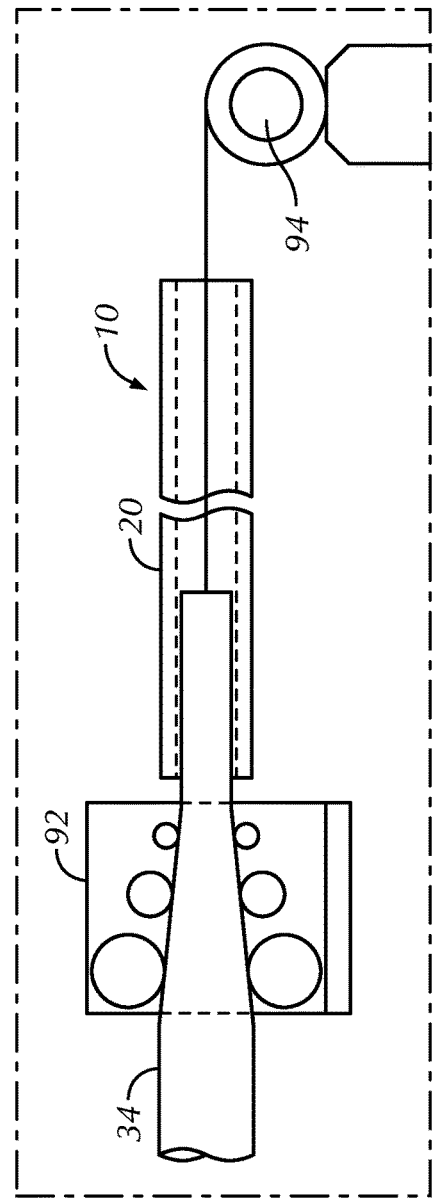
FIG. 8 is a schematic view of replacing a protective polymeric sheath in accordance with embodiments of the present disclosure.

Referring to FIG. 8, in one or more embodiments, a method for mounting the end fitting 14, as described above, is illustrated. A flexible pipe 10 is provided and a front region 36 of the internal sheath 18 may be stripped from the pressure vault 30, the first and second armor layer 24, 25, the exterior sheath 32 and the carcass 37. As shown in FIG. 7, the end sections 40 of the armoring layers 24, 25 may be prepared to be received in the reception chamber 46. The end sections 40 may be dismissed from the front region 36 of the pressure sheath 20 and the pressure vault 30. Additionally, the method may include providing an end vault 42 as described above and fixing said end vault 42 over the at least one part of the front region 36 of the pressure sheath 20. Once a cannula 64 is provided, the cannula 64 may be inserted in the central passage 16 for supporting the part of the front region 36 of the pressure sheath 20. In non-limiting example, the cannula 64 may be pushed by a tooling that may be supported by the end vault 42 which will act as reaction point. The pressure sheath 20 may be circumferentially tightened between the protrusion 66 and the cannula 64. When the cannula 64 is in place, the cannula 64 may not be subject to any displacement due to the compressive forces applied by the rear portion 70 of the cannula 64 to the pressure sheath 20 during the mounting.

In one or more embodiments, the outer cover 44 may be arranged and fixed on the end vault 42. The rear sealing assembly may be fixed and activated by clamping on the outer cover 44. Further, the reception chamber 46 may be filled with a filling material such as an epoxy resin or a thermoplastic resin. Alternatively, the reception chamber 46 may be filled with a filling material prior to the insertion of the cannula 64.

In some embodiments, a pressure sheath 20 of a flexible pipe 10 may be replaced after being damaged chemically or mechanically. In order to replace the pressure sheath 20, the method may include removing the cannula 64 to allow releasing the pressure sheath 20 from the end termination of the flexible pipe 10. In a non-limiting example, the cannula 64 may be removed by extracting the cannula 64 via mechanical means such that grooves or holes may be made in the cannula 64 to allow an engagement of a mechanical or hydraulic extractor tool. Activation of the tool disengages the cannula 64 and extracts the cannula 64 from the end fitting 14. In a case that the cannula 64 is extensively damaged, longitudinal cuts may be performed on the entire length of the cannula 64 to split it in sectors, for example two, three or more sectors. This allows releasing the compressive forces exerted by pressure sheath and provides a sufficient clearance to remove the cannula 64 by sectors. One skilled in the art will appreciate how the risk to damage the end fitting 14 is limited since the pressure sheath 20 protects the interior surface 48 of the end vault 42 from the tool. The cannula 64 may also be extracted by consists in setting a watertight packer in the cannula 64. The flexible pipe 10 is then filled with water and pressurized to push the cannula 64 out.

With the cannula 64 extracted, the pressure sheath 20 may be extracted from the flexible pipe 10 from an end of the end fitting 14. The pressure sheath 20 may be extracted by inserting a thin cannula between an exterior surface of the pressure sheath 20 and the end fitting 14. The thin cannula may act as a support element for a tool expanding on thereon. The tool, such as a packer or a mechanical expander, may be able to grip the pressure sheath 20. In a non-limiting, two tools may be installed on both ends of the flexible pipe 10 to exert tension on the pressure sheath 20 and decrease the diameter of the pressure sheath 20. Further, controlled tension winches may be used on both end of the flexible pipe for controlling the tension exerted on the pressure sheath 20. In some embodiments, a come along may be used on the pullout side and a braking system is used on the other side for short sections of pipe. It is further envisioned that a tool, with multiple cutting blades, may be pulled through the flexible pipe 10 to segment the pressure sheath 20. Then, the pressure sheath 20 may be easily released segment by segment.

As shown in FIG. 8, in some embodiments, the pressure sheath 20 may be elongated using a die or a roller box 92 at one end of the flexible pipe 10 corresponding to the insertion point. A pulling force may be applied to one end of the pressure sheath 20. In a non-limiting example, a winch 94 is attached to the end of the pressure sheath 20. By applying a tensile force on the pressure sheath 20, the pressure sheath 20 elongates and reduces in diameter. The die or the roller box 92 acts as a breaking force working against the winch 94.

Figure 9:
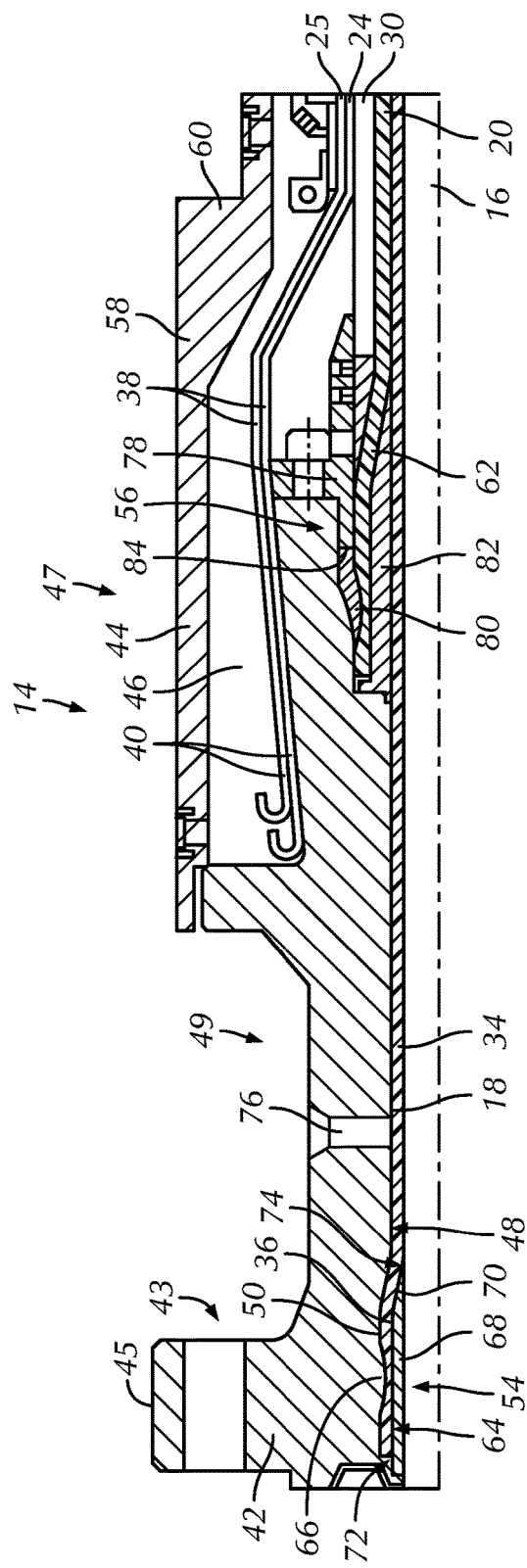
FIGS. 9-12 are schematic views of an end fitting in accordance with embodiments of the present disclosure.

Referring to FIG. 9, in one or more embodiments, the flexible pipe 10 may include both a protective polymeric sheath 34 and a pressure sheath 20 disposed externally to the protective polymeric sheath 34. The protective polymeric sheath 34 may be arranged in an inner surface of the pressure sheath 20. One skilled in the art will appreciate how the protective polymeric sheath 34 may protect the pressure sheath 20 from the fluid circulating in the central passage 16. The protective polymeric sheath 34 may protect the inner surface of the pressure sheath 20 in case the fluid circulating in the central passage 16 comprises elements such as sand grain which may damage the inner surface of the pressure sheath 20. In a non-limiting example, the protective polymeric sheath 34 may be formed by a polymeric material, for example based on a polyolefin such as a polyethylene or based on a polyamide such as a PA11 or a PA12 or based on a fluorinated polymer such as polyvinylidene fluoride (PVDF). In some embodiments, the protective polymeric sheath 34 may be formed by an elastomer based materials or a polyurethane. A thickness of the protective polymeric sheath 34 may be between 5 mm and 30 mm.

The protective polymeric sheath 34 may have a front region 36 inserted in the end fitting 14. In one or more embodiments, the protective polymeric sheath 34 may either co-extruded with the pressure sheath 20 or fabricated separately. Additionally, the internal polymeric sheath 18 may be formed by the protective polymeric sheath 34. As shown FIG. 9, the front sealing assembly 54 may be arranged around the protective polymeric sheath 34. Further, the end fitting further may include an intermediate sealing assembly 56 around the pressure sheath 20. The intermediate sealing assembly 56 may include an intermediate crimping flange 78, an intermediate crimping ring 80 and an intermediate supporting cannula 82 interposed between the protective polymeric sheath 34 and the pressure sheath 20. The intermediate crimping ring 80 may be interposed between a rear surface 84 of the intermediate crimping flange 78 and the pressure sheath 20. The pressure sheath 20 relies on the intermediate supporting cannula 82.

The end fitting 14 may further include a test port 76 defined in the end vault 42 and arranged between the protrusion 66 and the intermediate sealing assembly 56. The test port 76 allows testing the crimping effectiveness and thus the tightness of the end fitting 14. The test port 76 may be located in the intermediate region 49. In some embodiments, the test port 76 allows controlling the integrity of the flexible pipe 10. In a non-limiting example, the test port 76 allows measuring the pressure between the pressure sheath 20 and the protective polymeric sheath 34. When the protective polymeric sheath 34 is damaged, the pressure in the test port 76 increases indicating that the protective polymeric sheath has to be changed. The end fitting 14 of FIG. 9 may be mounted by fixing the intermediate sealing assembly 56 and activating it by clamping onto the end vault 42. Additionally, removing the protective polymeric sheath 34 or for inserting a new protective polymeric sheath 34 is similar to those described above for the pressure sheath 20.

Figure 10:
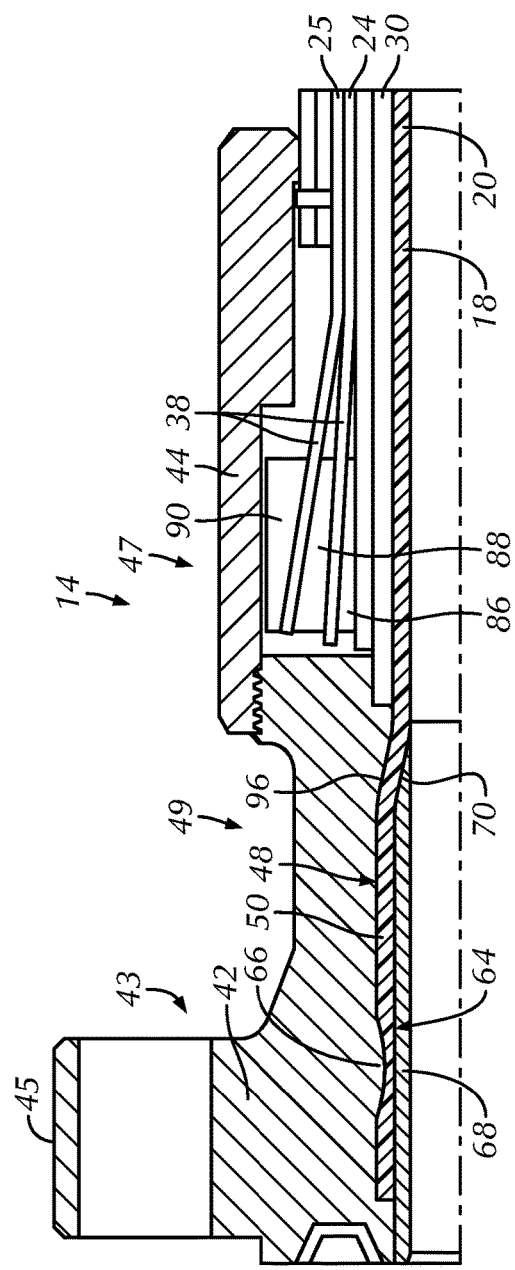

With reference to FIG. 10, in one or more embodiments, inside the reception chamber 46, the end fitting 14 may further includes an interior ring 86 on which the end sections 40 of the first armor layer 24 exteriorly bear on, an intermediate ring 88 interposed between the end sections 40 of the first armor layer 24 and the end sections 40 of the second armor layer 25, and an exterior ring 90 disposed in external support on the end sections 40 of the second armor layer 25. The internal surface 48 of the end vault 42 may have a front longitudinal part 50 connected to a rear part 96. The rear part 96 may extend along a direction intersecting the longitudinal direction X-X'. The rear portion 70 of the cannula 64 may be arranged facing to the rear part 96 of the internal surface 48 of the end vault 42. An exterior surface 72 of the front portion 68 of the cannula 64 and the front part 50 of the internal surface 48 of the end vault 42 may be substantially concentric. Further, an exterior surface 74 of the rear portion 70 of the cannula 64 and the rear part 96 of the internal surface 48 of the end vault 42 may be substantially concentric.

Figure 11:
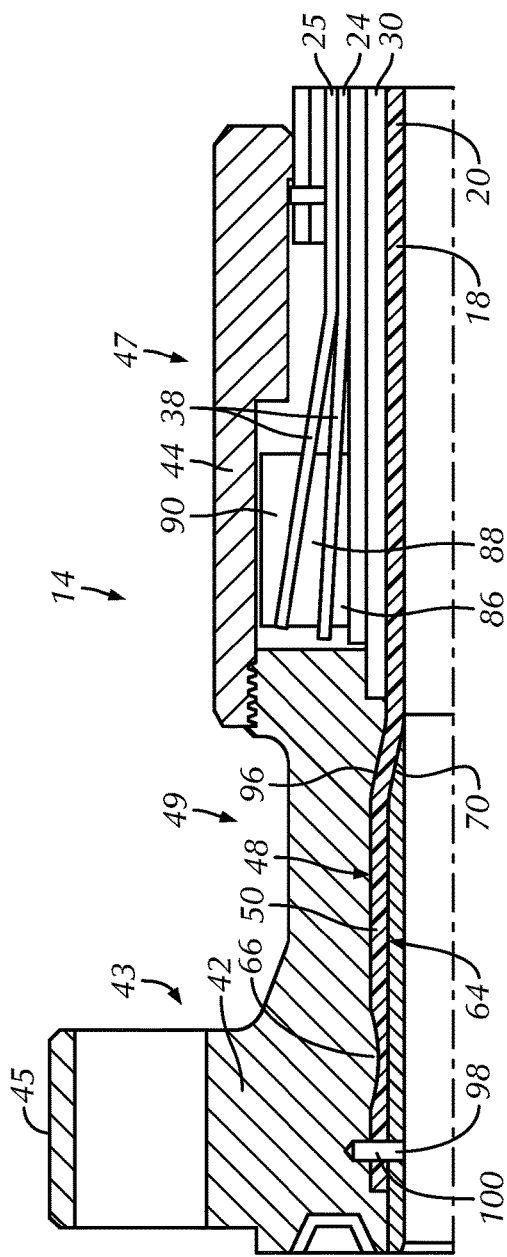

As shown in FIG. 11, in one or more embodiments, the end fitting 14 may further include a longitudinal restraining element 98 for restraining the cannula 64 to the end vault 42. In a non-limiting example, the restraining element 98 may be a pin 100 inserted through the cannula 64 into the end vault 42. It is further envisioned that the restraining element 98 may include a ring set in the end vault 42 or a protrusion part of the cannula 64 protruding towards the end vault 42 inserted in a circular groove defined in the end vault 42.

Figure 12:
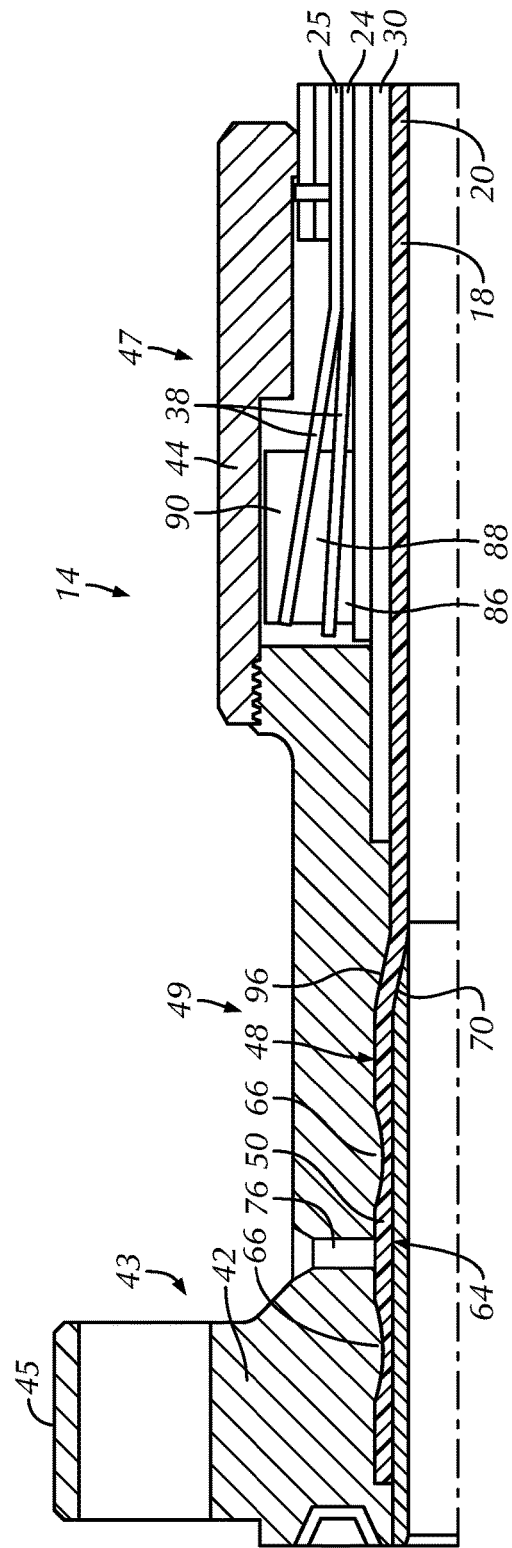

Referring now to FIG. 12, in one or more embodiments, the front sealing assembly 54 may include two annular protrusions 66 arranged along the longitudinal direction X-X'. The two protrusions 66 may have the same geometrical features. One of the protrusions 66 may radially extend in the intermediate region 49 of the end vault 42. In addition, the front sealing assembly 54 may have a test port 76 defined in the end vault 42 arranged between the two protrusions 66. The test port may allow for controlling the sealing of an inner space delimited by the internal surface 48 of the end vault 42 and an external surface of the internal sheath 18, between the annular protrusions 66.

Figure 13:
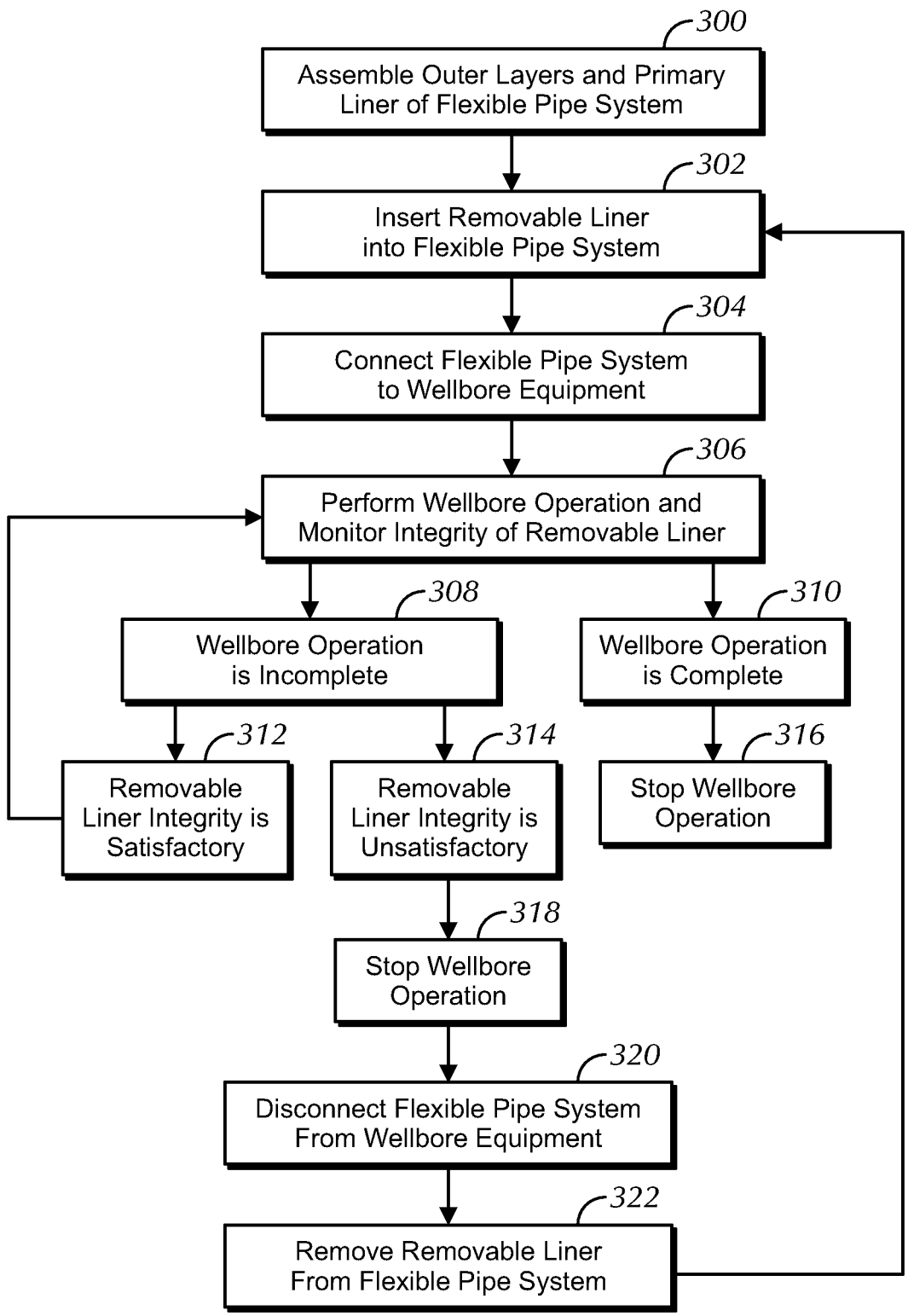
FIG. 13 is a flowchart in accordance with embodiments of the present disclosure.

In another aspect, the present disclosure relates to methods of assembling flexible pipe systems. The flexible pipe system may have some or all of the features described above with respect to FIGS. 3-12, and may include features not discussed above. Methods in accordance with the present disclosure may include some or all of the steps described below. FIG. 13 is a flowchart which illustrates an embodiment of this process, and will be referred to in the discussion below.

The primary liner 222 may be positioned inside of an outer layer which is intended to be the innermost outer layer. The remaining outer layers may be sequentially positioned around the innermost outer layer. The outer layers may include layers described above with respect to FIGS. 3-12, and methods of positioning each layer may be determined based on the specific nature of the layer. For example, the primary liner may be extruded to a desired thickness, and then the pressure vault and armor layers sequentially wound around the primary liner. The external sheath may then be extruded onto the outer armor later, upon which the external metal layers may then be disposed. End fittings (14, 252) may then be connected to a desired length of the flexible pipe, after which the removable liner may be installed. These procedures may correspond to step 300 in FIG. 13.

The removable liner 224 may be positioned inside of the primary liner 222. Positioning the removable liner 224 inside of the primary liner 222 may include, for example, stretching the removable liner 224 from both ends, and thereby decreasing the diameter of the removable liner 224, and positioning the stretched removable liner 224 through the primary liner 222. The removable liner 224 may then be attached at a first end, released to return to an unstretched length and diameter, and then attached at a second end. These procedures may correspond to step 302 in FIG. 13. Alignment between the liners 222, 224 and outer layers may be ensured along the entire length of the liners 222, 224 and outer layers using any means known in the art. One skilled in the art will recognize that although the assembly of liners 222, 224 and outer layers is described here in a particular order, the liners 222, 224 and outer layers may be assembled in any order without departing from the scope of the disclosure.

As another example, the removable liner may be compressed, bent, folded or otherwise manipulated to have a smaller external diameter than the internal diameter of the primary liner. The removable liner may then be disposed within the primary liner and then manipulated to expand to its original configuration. For example, application of pressure to the internal surface area of the removable liner may be used to unfold the removable liner and expand it back to a cylindrical configuration abutting the primary liner. These procedures may correspond to step 302 in FIG. 13.

As a further method for disposing the removable liner within the primary liner, a helical structure may be used to form the annular flow region between the primary and removable liners. The helical structure may be in the form of a spring, for example. The spring may be disposed around the removable liner, the spring stretched to compress the removable liner, the assembly disposed within the primary liner, and then the spring may be released to allow the removable liner to expand to its cylindrical configuration abutting the primary liner. These procedures may correspond to step 302 in FIG. 13.

As discussed above, the flexible pipe system 250 may be assembled such that an annulus 236 is maintained between the liners 222, 224. In some embodiments, the annulus may be maintained by structures formed on the surface(s) of one or both liners 222, 224. In such embodiments, manufacture of the liners 222, 224 may include manufacture of these structures. In some embodiments, the annulus may be maintained by additional structures 238. In such embodiments, a method of assembling the flexible pipe system 250 may include a step of arranging those structures 238 within the liners 222, 224.

An end fitting (252, 14) may be disposed at one or both ends of the flexible pipe 200 comprising the liners 222, 224 and the outer layers 202. The liners 222, 224 and the outer layers 202 may be arranged with respect to features of the end fitting 252, such as those described above. Seals may be formed between the end fitting 252 and the liners 222, 224 and the outer layers 202. In some embodiments, the removable liner 224 may be positioned inside of the primary liner 222 after the end fitting has been coupled to the primary liner 222 and/or the outer layers 202.

As discussed above, the flexible pipe system 250 may include a pressure port 272 and a sensor (not shown). A method of assembling the flexible pipe system 250 may include forming a pressure port 272, placing the pressure port 272 in fluid connection with the annulus 236, and attaching a sensor, as described above, to the pressure port 272. Forming a pressure port 272 may comprise forming a passageway through the end fitting (252, 14). In some embodiments, sensors may be placed within the annulus 236.

In another aspect, the present disclosure relates to methods of performing wellsite operations using a flexible pipe system. The flexible pipe system may have some or all of the features described above with respect to FIGS. 3-12, and may include features not discussed above. Methods in accordance with the present disclosure may include some or all of the steps described below.

A flexible pipe system 250 may be attached to wellsite equipment. In some embodiments, the flexible pipe system 250 may be attached in locations where traditional rigid piping is typically attached. For example, the flexible pipe system may be used in accordance with one or more embodiments described in U.S. Provisional application Ser. No. 15/308,735, which is hereby incorporated by reference. Connections between the flexible pipe system 250 and the wellsite equipment may be tested to ensure the connections can safely withstand the necessary pressure. These procedures may correspond to step 304 in FIG. 13.

A wellbore fluid may be injected through the flexible pipe system 250. The fluid may be erosive and/or corrosive, and may be injected at a high pressure and/or temperature. The fluid may be injected at a known pressure and/or flow rate, and the pressure and/or flow rate may be monitored by any means known in the art. These procedures may correspond to step 306 in FIG. 13. Determination of whether or not a wellbore operation is complete, corresponding to options 308 and 310, may be made throughout the operation. If the wellbore operation is complete, the operation may be stopped, according to step 316. Otherwise, the operation may continue as described below.

Integrity of the flexible pipe system 250 may be monitored throughout performance of this method. System integrity may include monitoring a sensor that may detect fluid entry into the annulus 236, such as the above-described pressure, moisture, or dielectric sensors, among others. The sensors may be monitored by a human operator or by a computer-based control system. These procedures may correspond to step 306 in FIG. 13. Determination of whether or not the integrity of the flexible pipe system 250, especially the removable liner is satisfactory, correspond to options 312 and 314 in FIG. 13.

Damage to a removable liner 224 may be indicated by a sensor. Due to the integrity of the system, resulting from the primary liner, the damage to the primary liner may allow operations to continue temporarily. Use of the flexible pipe system 250 may be stopped immediately or at a future time, as appropriate to the operation and/or the operator's directive (for example, one operator may choose to remove any damaged piping systems from operation immediately, regardless of the status of the operation, to avoid further damage to the piping system primary liner, while other operators, recognizing the integrity and run length that may be provided by the internal liner, may choose to continue operations to a convenient point for removal of the damaged pipe. These procedures may correspond to step 318 in FIG. 13.

When injection of the fluid through the flexible pipe system 250 is stopped, the removable liner 224 may be replaced. The flexible pipe system 250 may be disconnected from wellsite equipment at one or both ends. The removable liner 224 may be visually inspected for damage. As discussed above, the removable liner 224 and the primary liner 222 may be different colors, which may aid the visual inspection. The removable liner 224 may be removed from the flexible pipe system 250. In some embodiments, removing the removable liner 224 may comprise removing components, such as a distal connector 266. Removing the removable liner 224 may comprise disconnecting the removable liner 224 at both ends, stretching the removable liner 224 such that a diameter of the removable liner is decreased, and extending the removable liner 224 through the primary liner 222 from a first end to a second end. These procedures may correspond to steps 320 and 322 in FIG. 13.

A new removable liner 224 may then be installed in the flexible pipe system 250. The installation may comprise some or all of the same steps described above with respect to the initial installation of a removable liner 224 in the system 250. The removable liner 224 may be positioned inside of the primary liner 222. Seals may be formed between the removable liner 224 and the end fittings (252, 14). The annulus 236 may be maintained between the removable liner 224 and the primary liner 222. In some embodiments, components such as a distal connector 266 may be reattached. These procedures may correspond to step 302 in FIG. 13.

The flexible pipe system 250 may be reattached to the wellsite equipment and the connections may be tested. A fluid may be injected through the flexible pipe system 250 as described above. These steps may be repeated any number of times. For example, these steps may be repeated until a wellbore operation is completed. An exemplary embodiment of the iterative procedure is illustrated in FIG. 13.

Methods of assembling flexible pipe systems and methods of using flexible pipe systems in accordance with the present disclosure may be combined in wellsite operations. For example, a flexible pipe system may be assembled and then used. A removable liner of the flexible pipe system may be replaced during use of the flexible pipe system. A flexible pipe system may be partially or fully reassembled during operations. One skilled in the art will readily envision additional ways in which these types of methods may be used in conjunction with each other, and such combinations are within the scope of the present disclosure.

As discussed throughout this disclosure, flexible pipes, flexible piping systems, and methods of using the same may have advantages over traditional devices, systems, and methods used in hydraulic fracturing systems. Embodiments discussed herein may allow a removable liner to be removed and replaced as necessary to extend the lifespan of a flexible pipe and to prevent failure of the flexible pipe system.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method comprising:
   injecting an erosive fluid through a flexible piping system connected to a downstream component and an upstream component, the flexible piping system comprising:
   a primary liner;
   a removable liner; and
   an annulus disposed between the primary liner and the removable liner;
   monitoring an integrity of the removable liner via one or more sensors disposed within or fluidly connected to the annulus; and
   replacing the removable liner, wherein replacing the removable liner comprises:
   stopping injection of the erosive fluid through the flexible piping system;
   purging the erosive fluid from the flexible piping system;
   disconnecting the flexible piping system from the upstream and downstream components;

removing the removable liner from the flexible piping system;

positioning a new removable liner internal to the primary liner;

reconnecting the flexible piping system to the upstream and downstream components; and resuming injection of an erosive fluid through the flexible piping system.

2. The method of claim 1, further comprising visually inspecting the removable liner.

3. The method of claim 1, wherein removing the removable liner further comprises stretching the removable liner, and extending the removable liner through the primary liner.

* * * * *